US011423667B1

(12) United States Patent
Hua et al.

(10) Patent No.: US 11,423,667 B1
(45) Date of Patent: Aug. 23, 2022

(54) GEOLOCATING AN OBJECT USING A SINGLE CAMERA

(71) Applicant: Sea Machines Robotics, Inc., Boston, MA (US)

(72) Inventors: Fang Hua, Bedford, MA (US); Peng Zhao, Winchester, MA (US); Trevor Vieweg, San Diego, CA (US)

(73) Assignee: Sea Machines Robotics, Inc., Boston, MA (US)

( * ) Notice: Subject to any disclaimer, the term of this patent is extended or adjusted under 35 U.S.C. 154(b) by 0 days.

(21) Appl. No.: 17/570,914

(22) Filed: Jan. 7, 2022

Related U.S. Application Data

(60) Provisional application No. 63/295,658, filed on Dec. 31, 2021.

(51) Int. Cl.
| | |
|---|---|
| *G06V 20/58* | (2022.01) |
| *G06V 20/20* | (2022.01) |
| *G06V 10/48* | (2022.01) |
| *G06T 7/168* | (2017.01) |
| *G06T 7/70* | (2017.01) |
| *B63B 43/18* | (2006.01) |
| *B63B 49/00* | (2006.01) |
| *G06T 19/00* | (2011.01) |
| *G08G 3/02* | (2006.01) |

(52) U.S. Cl.
CPC ............. *G06V 20/58* (2022.01); *B63B 43/18* (2013.01); *B63B 49/00* (2013.01); *G06T 7/168* (2017.01); *G06T 7/70* (2017.01); *G06T 19/006* (2013.01); *G06V 10/48* (2022.01); *G06V 20/20* (2022.01); *G08G 3/02* (2013.01); *G06T 2207/10016* (2013.01); *G06T 2207/20061* (2013.01); *G06T 2207/30252* (2013.01)

(58) Field of Classification Search
CPC .. G08G 3/02; G06T 7/168; G06T 7/70; G06T 19/006; G06T 2207/10016; G06T 2207/20061; G06T 2207/30252; B63B 43/18; B63B 49/00; G06V 10/48; G06V 20/20; G06V 20/58
See application file for complete search history.

(56) References Cited

U.S. PATENT DOCUMENTS

| | | | | |
|---|---|---|---|---|
| 10,055,648 | B1 * | 8/2018 | Grigsby | G06K 9/6267 |
| 10,473,429 | B1 * | 11/2019 | Louchard | G06K 9/6218 |
| 2014/0314270 | A1 * | 10/2014 | Nguyen | G06V 20/13 |
| | | | | 382/103 |
| 2015/0323648 | A1 * | 11/2015 | Haglund | G06T 7/80 |
| | | | | 701/4 |

(Continued)

FOREIGN PATENT DOCUMENTS

EP    2355451 B1 *  1/2013  ............. G01S 7/003

OTHER PUBLICATIONS

Chen et al. "Wide-baseline obstacle mapping using monocular camera for unmanned surface vehicle." 2019 IEEE 15th International Conference on Control and Automation (ICCA). IEEE, 2019. (Year: 2019).*

(Continued)

*Primary Examiner* — Katrina R Fujita
(74) *Attorney, Agent, or Firm* — Bass Patent Law, LLC

(57) ABSTRACT

A camera mounted on a seafaring vessel obtains an image showing an object. The distance to the object is computed using, in part, a normal vector of the plane containing the camera and the horizon.

22 Claims, 13 Drawing Sheets

(56) References Cited

U.S. PATENT DOCUMENTS

| | | | | |
|---|---|---|---|---|
| 2015/0378361 | A1* | 12/2015 | Walker | G06T 7/194 |
| | | | | 114/343 |
| 2016/0125739 | A1* | 5/2016 | Stewart | B63B 43/18 |
| | | | | 701/301 |
| 2016/0187140 | A1* | 6/2016 | Clarke | G05D 1/0206 |
| | | | | 701/25 |
| 2017/0374246 | A1* | 12/2017 | Wang | H04N 5/2257 |
| 2020/0057488 | A1* | 2/2020 | Johnson | G06V 20/40 |
| 2022/0024549 | A1* | 1/2022 | Biancale | G06V 10/751 |

OTHER PUBLICATIONS

Gladstone et al. "Distance estimation for marine vehicles using a monocular video camera." 2016 24th European Signal Processing Conference (EUSIPCO). IEEE, 2016. (Year: 2016).*

Grelsson et al. "HorizonNet for visual terrain navigation." 2018 IEEE International Conference on Image Processing, Applications and Systems (IPAS). IEEE, 2018. (Year: 2018).*

Mou et al. "Wide-baseline stereo-based obstacle mapping for unmanned surface vehicles." Sensors 18.4 (2018): 1085. (Year: 2018).*

Park et al. "Autonomous collision avoidance for unmanned surface ships using onboard monocular vision." OCEANS 2015-MTS/IEEE Washington. IEEE, 2015. (Year: 2015).*

Prasad et al. "Video processing from electro-optical sensors for object detection and tracking in a maritime environment: a survey." IEEE Transactions on Intelligent Transportation Systems 18.8 (2017): 1993-2016. (Year: 2017).*

Shin et al. "Vision-based navigation of an unmanned surface vehicle with object detection and tracking abilities." Machine Vision and Applications 29.1 (2018): 95-112. (Year: 2018).*

* cited by examiner

GEOLOCATING AN OBJECT USING A SINGLE CAMERA

CROSS-REFERENCE TO RELATED APPLICATIONS

This application claims priority to U.S. Provisional Patent Application No. 63/295,658 filed on Dec. 31, 2021, the entire content of which is hereby incorporated by reference.

BACKGROUND

In navigation, it is often desirable to know the distance between the vessel being navigated and other objects in the vessel's vicinity. For autonomously navigated vessels, it is further desirable to be able to determine this information automatically from sensors aboard the vessel.

Some traditional ways to compute the distance from the vessel to an object involve sensors other than cameras. Yet other traditional ways to compute these distances involve multiple cameras. These traditional techniques have drawbacks. The techniques described herein may allow for the identification of the distance from the vessel to an object using only a single image obtained by a single camera mounted on the vessel.

SUMMARY

A camera mounted on a seafaring vessel obtains an image showing an object. The distance to the object is computed using, in part, a normal vector of the plane containing the camera and the horizon.

In an aspect, a method disclosed herein may include: obtaining an image showing a horizon and an object from a camera mounted on a seafaring vessel; identifying a plane passing through the camera and the horizon; identifying a normal vector to the plane; identifying a distance from the seafaring vessel to the object using the normal vector to the plane; and, on an augmented reality interface, displaying an augmented reality image including the object and the distance from the seafaring vessel to the object.

Implementations may include one or more of the following features. The plane may be identified from the image using a Hough transform. The Hough transform may only sample an area of the image corresponding to an expected location of the horizon. The camera may be mounted on the vessel at a height h from sea level in calm water, where the expected location of the horizon includes a distance interval centered at $Ah^{1/2}$, where h is measured in meters and A is equal to 3.6 $km/m^{1/2}$. The seafaring vessel may include an inertial measurement unit operable to report the vessel's roll angle $\theta_{roll}$ and pitch angle $\theta_{pitch}$, and in which the camera is mounted on the vessel at a height h from sea level in calm water, where the expected location of the horizon includes a distance interval centered at $A \sin(\theta_{roll})\sin(\theta_{pitch})h^{1/2}$, where h is measured in meters and A is equal to 3.6 $km/m^{1/2}$. The seafaring vessel may include an inertial measurement unit operable to report the vessel's roll angle $\theta_{roll}$ and pitch angle $\theta_{pitch}$; the camera may be mounted on the vessel at a height h from sea level in calm water; and the plane may be identified as passing through the position of the camera and a line at sea level a distance D away from the camera given by $D = A \sin(\theta_{roll})\sin(\theta_{pitch})h^{1/2}$, where h is measured in meters and A is equal to 3.6 $km/m^{1/2}$. The distance d from the seafaring vessel to the object may be given by:

$$d = \sqrt{\left(\frac{h}{\cos B}\right)^2 - h^2}$$

where v is the vector from the camera to the object, n is the normal vector, B is line-of-sight angle from the camera to the object, and h is the height above sea level at which the camera is mounted on the vessel in calm water. The seafaring vessel may include an inertial measurement unit operable to report the vessel's roll angle $\theta_{roll}$ and pitch angle $\theta_{pitch}$, and in which h is scaled in the equation of claim 7 by $\sin(\theta_{roll})\sin(\theta_{pitch})$. The augmented reality interface may include a real time video feed from the camera. The augmented reality interface may include an overhead map of a waterway showing the vessel and the object. The method may further include using the identified distance to make a navigational maneuver. The navigational maneuver may be made by the seafaring vessel. The navigational maneuver may be made by a vessel other than the seafaring vessel.

In an aspect, a system disclosed herein may include a camera mounted on a seafaring vessel and machine-readable instructions that, when executed, cause one or more processors to: obtain an image showing a horizon and an object from the camera; identify a plane passing through the camera and the horizon; identify a normal vector to the plane; identify a distance from the seafaring vessel to the object using the normal vector to the plane; and, on an augmented reality interface, display an augmented reality image including the object and the distance from the seafaring vessel to the object.

Implementations may include one or more of the following features. The plane may be identified from the image using a Hough transform. The Hough transform may only sample an area of the image corresponding to an expected location of the horizon. The camera may be mounted on the vessel at a height h from sea level in calm water, wherein the expected location of the horizon includes a distance interval centered at $Ah^{1/2}$, where h is measured in meters and A is equal to 3.6 $km/m^{1/2}$. The seafaring vessel may include an inertial measurement unit operable to report a roll angle $\theta_{roll}$ and a pitch angle $\theta_{pitch}$ of the vessel, and in which the camera is mounted on the vessel at a height h from sea level in calm water, wherein the expected location of the horizon includes a distance interval centered at $A \sin(\theta_{roll})\sin(\theta_{pitch})h^{1/2}$, where h is measured in meters and A is equal to 3.6 $km/m^{1/2}$. The seafaring vessel may include an inertial measurement unit operable to report a roll angle $\theta_{roll}$ and a pitch angle $\theta_{pitch}$ of the vessel; the camera may be mounted on the vessel at a height h from sea level in calm water; and the plane may be identified as passing through the position of the camera and a line at sea level a distance D away from the camera given by $D = A \sin(\theta_{roll})\sin(\theta_{pitch})h^{1/2}$, where h is measured in meters and A is equal to 3.6 $km/m^{1/2}$. The distance d from the seafaring vessel to the object may be given by:

$$d = \sqrt{\left(\frac{h}{\cos B}\right)^2 - h^2}$$

where v is the vector from the camera to the object, n is the normal vector, B is line-of-sight angle from the camera to the object, and h is a height above sea level at which the camera is mounted on the vessel in calm water. The seafaring vessel may include an inertial measurement unit operable to report a roll angle $\theta_{roll}$ and a pitch angle $\theta_{pitch}$ of the vessel, and in which h is scaled in the equation of claim 20 by $\sin(\theta_{roll})\sin(\theta_{pitch})$. The augmented reality interface may include a real time video feed from the camera. The augmented reality interface may include an overhead map of a waterway showing the vessel and the object. The system may further include machine-readable instructions that, when executed, cause one or more processors to use the identified distance to make a navigational maneuver. The navigational maneuver may be made by the seafaring vessel. The navigational maneuver may be made by a vessel other than the seafaring vessel.

These and other features, aspects, and advantages of the present teachings will become better understood with reference to the following description, examples, and appended claims.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
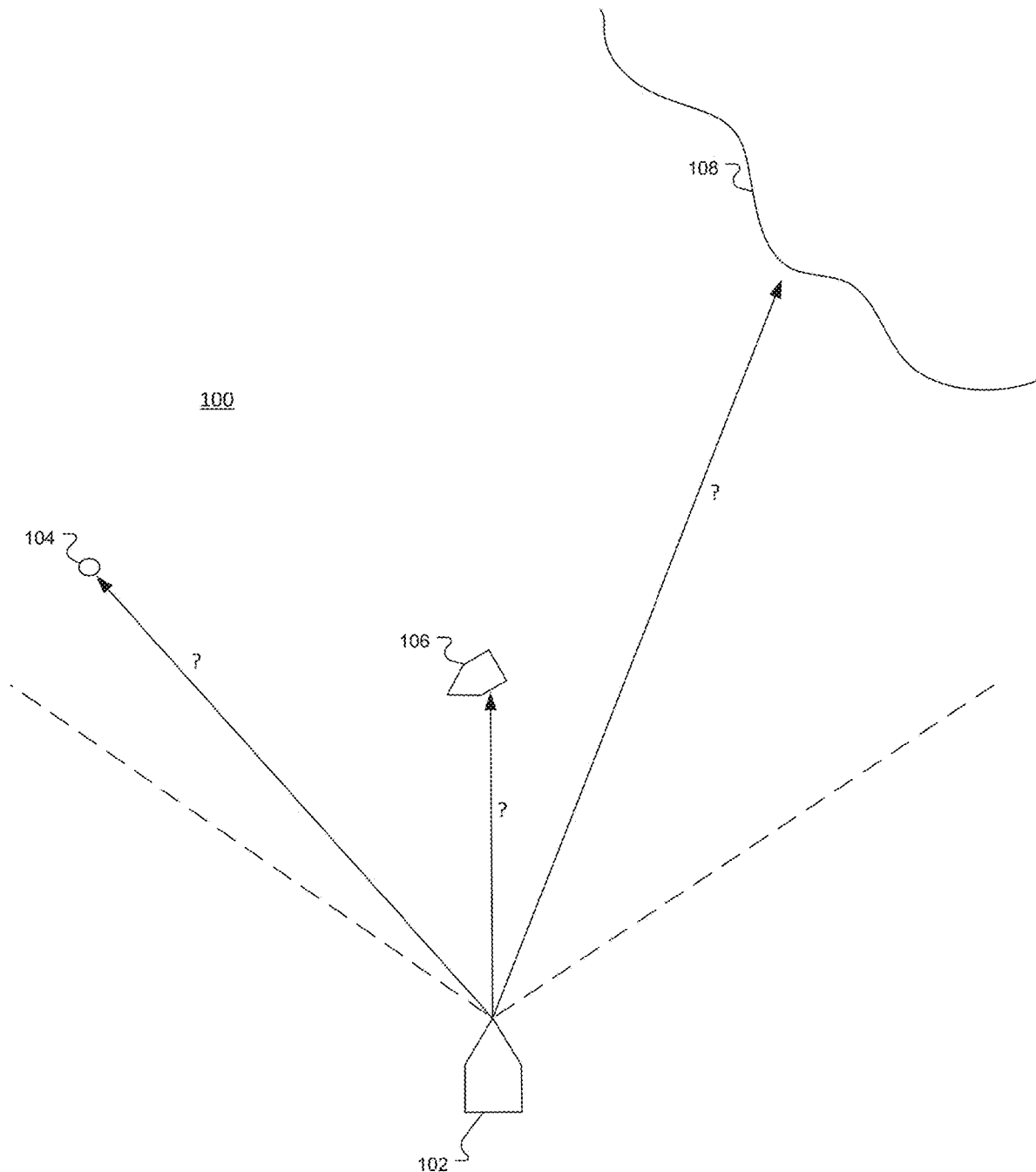
FIG. 1 is an overhead view of a waterway, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

It is often desirable to be able to identify the distance between two objects. In particular, it is often desirable to determine the distance between an autonomous vehicle and an object in the vehicle's environment. Identifying this distance is useful for many purposes, including but not limited to avoiding collisions with that object.

One paradigm of locating an object involves the use of two or more cameras. When the cameras are in a known position relative to each other, images acquired separately by each camera can be analyzed together. The distance and direction from the cameras to an object that is present in both images can identified by a variety of techniques. This two-camera paradigm is sometimes referred to "binocular location" or "parallax location."

However, binocular location has drawbacks. For example, the long range accuracy of this approach is often limited by the distance the two cameras are separated. In the context of autonomous vehicles, long range accuracy is thus limited by the width of the vehicle. Separately, binocular location requires two cameras, which affects the cost and robustness of an autonomous vehicle.

A separate, one-camera paradigm of locating an object involves illuminating the object with a specialized source of radiation, such as a pulsed laser. By analyzing optical characteristics of the reflected radiation (e.g., a degree phase shift, a degree of optical attenuation, or other characteristics), the distance to the object can be determined.

However, this approach may also have drawbacks. For example, in some contexts it is desirable for the camera location to remain secret, which is inconsistent with using a separate source of illumination. And even when secrecy is not a concern, this approach requires a separate illumination source, which again affects the cost and robustness of the autonomous vehicle.

The techniques described herein may allow an object to be located by a single camera, without the need for a separate source of illumination. Unless otherwise specified, the term "locating" an object as described herein means determining the distance from a known point (e.g., a camera mounted on an autonomous vessel) to the object, as well as the direction of that object relative to the known point. However, insofar as identifying the direction from the known point to the object is conventionally understood, determining the direction from the known point to the object will not be discussed in this document. An object may alternatively be "located" by determining its location in some external coordinate system (including but not limited to its latitude and longitude, and/or a coordinate system centered on the camera or autonomous vessel). This is sometimes referred to as "geolocating" the object. Unless otherwise specified, locating an object and geolocating an object are synonymous in this document.

As used herein, an "object" refers to anything that can be optically distinguished from its background by a camera. This includes things that may be conventionally referred to as objects (such as a buoy or a boat or the like), as well as things that may not be conventionally referred to as objects (such as people, land masses, or patches of discolored water or the like).

FIG. 1 is an overhead view of a waterway. The waterway 100 includes an autonomous vessel 102 having an on-board camera. The camera's field of view is indicated by dashed lines, in which various objects lie. These objects include a buoy 104, another vessel 106, and a land mass 108. The techniques described herein may allow one to identify the distances from the vessel 102 to the objects 104, 106, and 108 or other objects. These distances are initially unknown.

Figure 2:
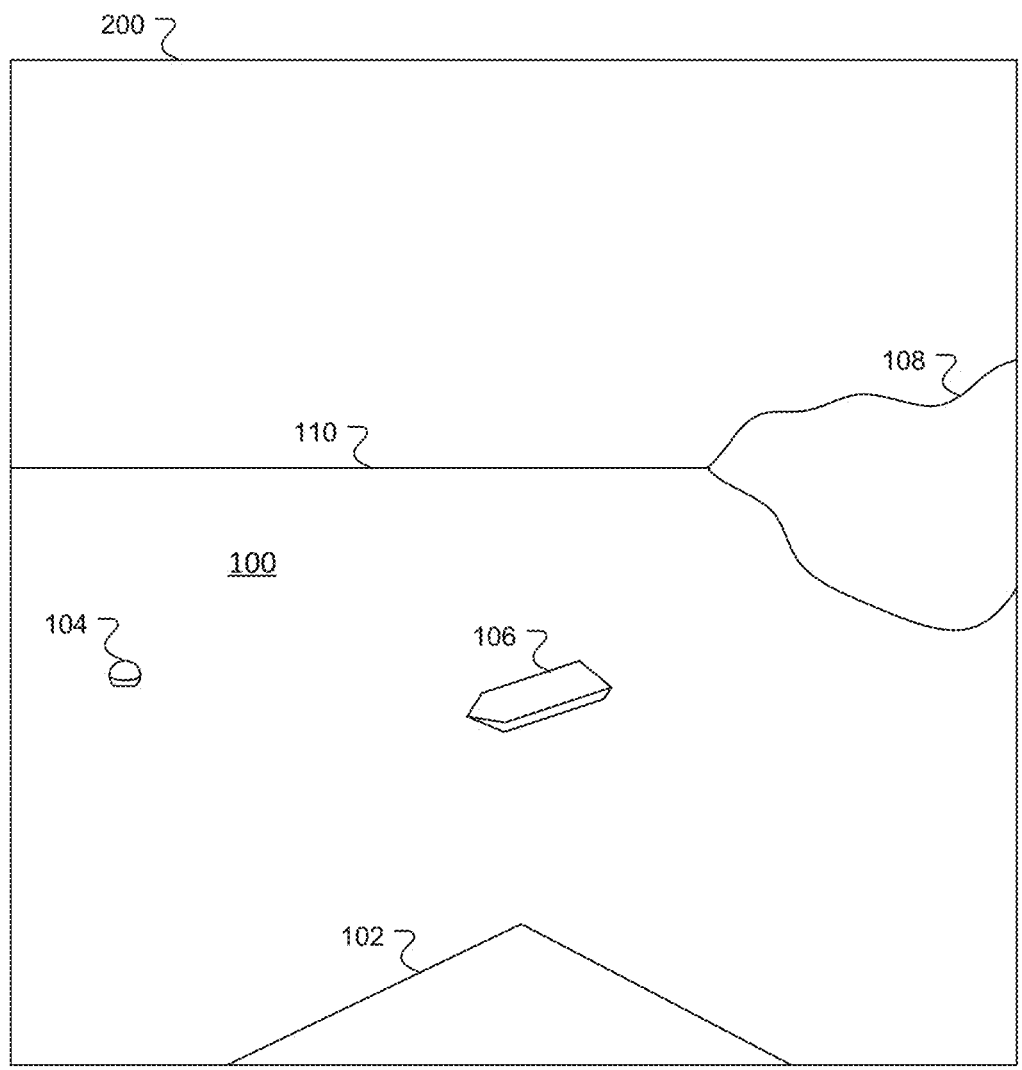
FIG. 2 is an exemplary image of the waterway of FIG. 1, in accordance with a representative embodiment.

FIG. 2 is an exemplary image of the waterway of FIG. 1. This image may correspond to an image acquired by the camera in FIG. 1. For example, the hull of the vessel 102 is visible, as are objects 104, 106, and 108. The horizon 110 is also present. As described more fully below, the techniques described herein involve identifying the horizon 110 in an image, which in turn is used to identify the distance to objects of interest.

Prior to identifying the horizon, traditional machine vision techniques may be employed to help identify features in an image, which may include objects or the horizon. For example, edges in the image may be detected using known algorithms, such as an implementation of the Canny edge detection algorithm or other similar algorithms. The output of such an algorithm is an image comprising a collection of edge points.

Figure 3:
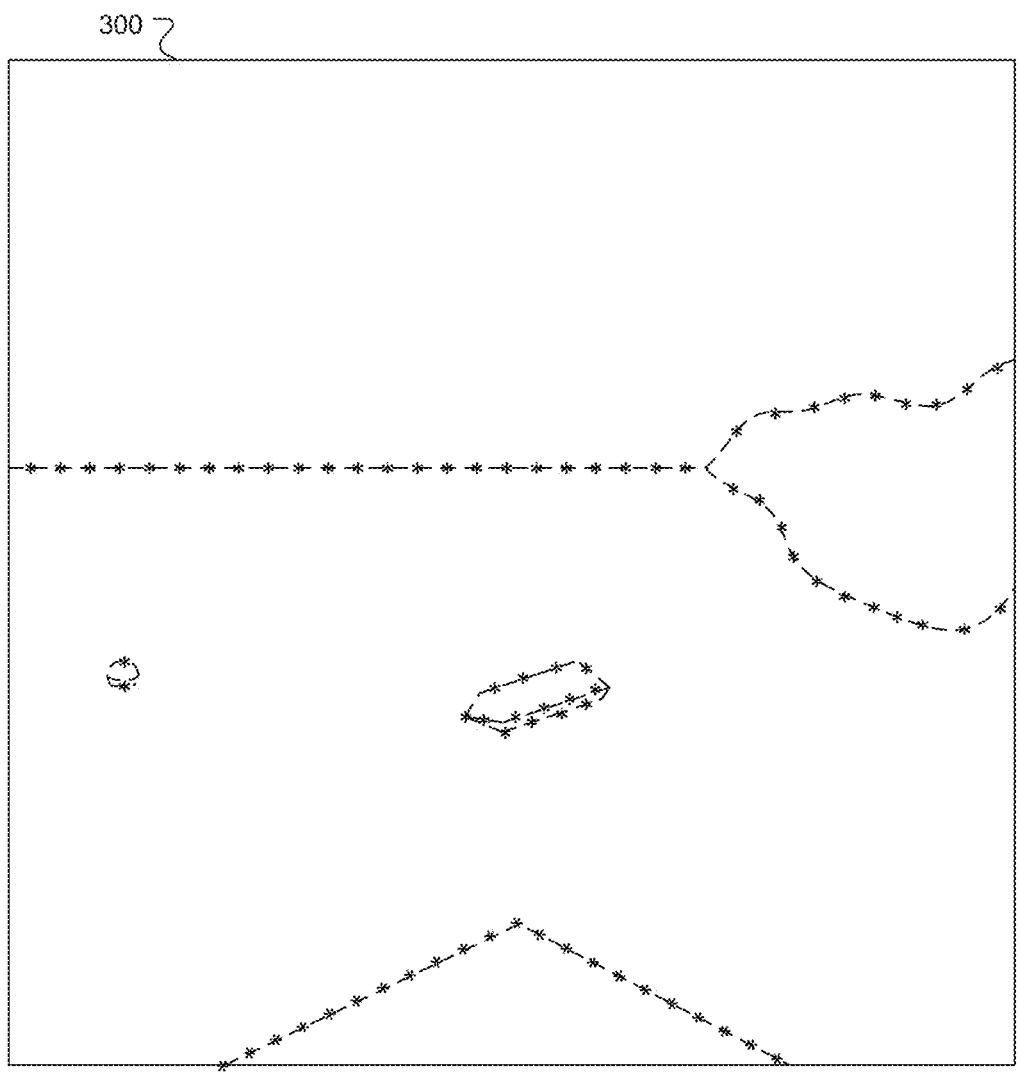
FIG. 3 is an exemplary processed image, in accordance with a representative embodiment.

FIG. 3 shows an exemplary processed image 300, with edge points denoted by asterisks. Relatively few edge points are shown in FIG. 3 for the sake of clarity and readability in what follows; in general, the number of edge points will be commensurate with the resolution of the original image and may be much higher than that shown in FIG. 3. Moreover, FIG. 3 also shows the original features in dashed lines, from which the edge points were derived. This is also for the sake of clarity in what follows; unless otherwise described herein, there is generally no need to superimpose a processed image on an unprocessed image.

Images acquired at sea are expected to contain very few features that comprise a long, straight line except for the horizon. Thus, the techniques described herein identify the horizon as the most "line-like" feature in a particular image. In some implementations, this feature may be identified by employing a Hough transform.

In more detail, a line in an image can be characterized by two parameters: its slope (often denoted m) and its intercept (often denoted b). The Hough transform involves sampling all possible slopes and all possible intercepts (or, as discussed further below, only a portion thereof), and iteratively determining how many edge points lie on a given line of a given slope and intercept. The number of edge points on a particular line is used as the magnitude in a histogram.

Figure 4:
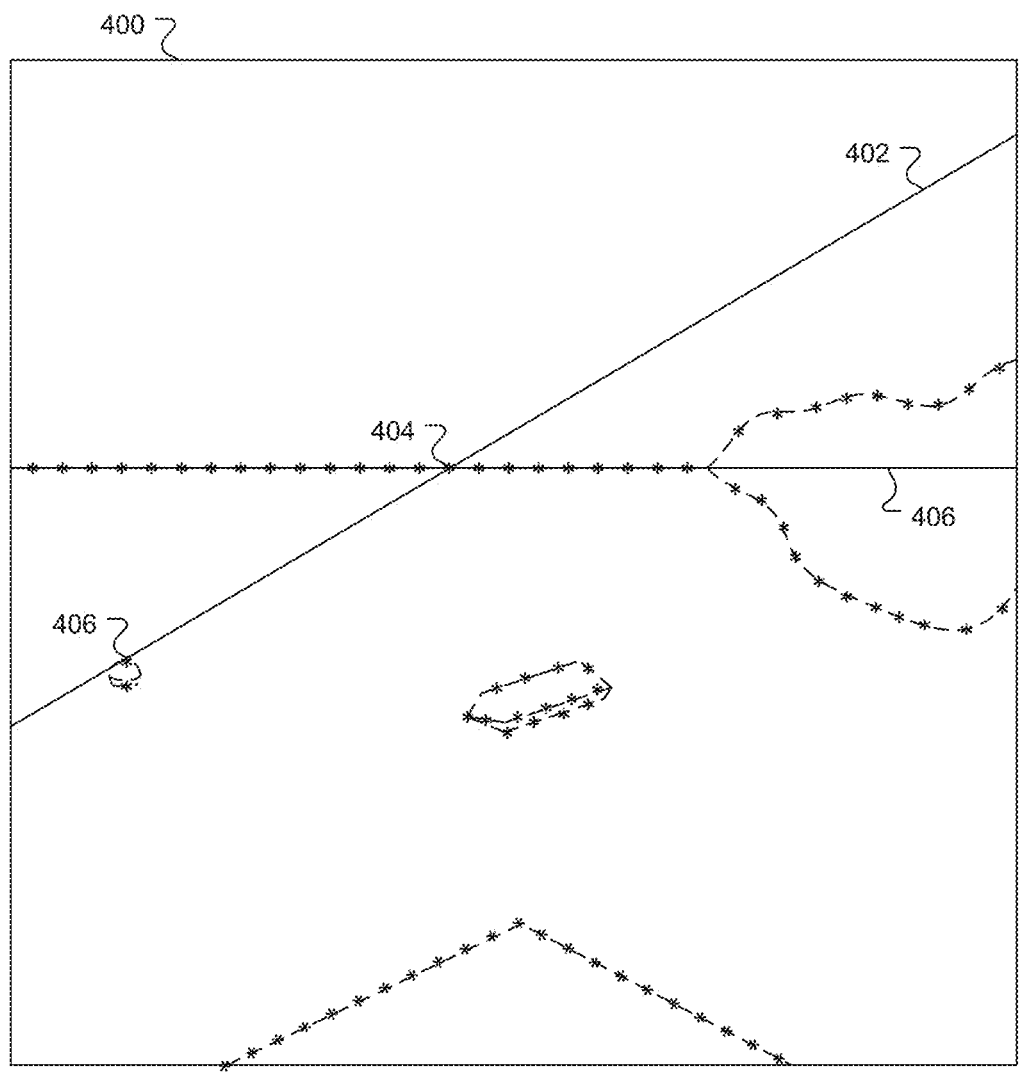
FIG. 4 is an exemplary processed image and an exemplary line sample, in accordance with a representative embodiment.

For example, FIG. 4 shows the exemplary processed image of FIG. 3, together with an exemplary line sample. Exemplary line 402 passes through edge point 404 and 406, but does not pass through any other edge point. Thus, line 402 contributes very little to the box in the histogram corresponding to its slope and intercept. On the other hand, line 406 passes through edge point 404, as well as many other edge points. Thus, line 406 will contribute substantially to the box of the histogram corresponding to its slope and intercept.

Figure 5:
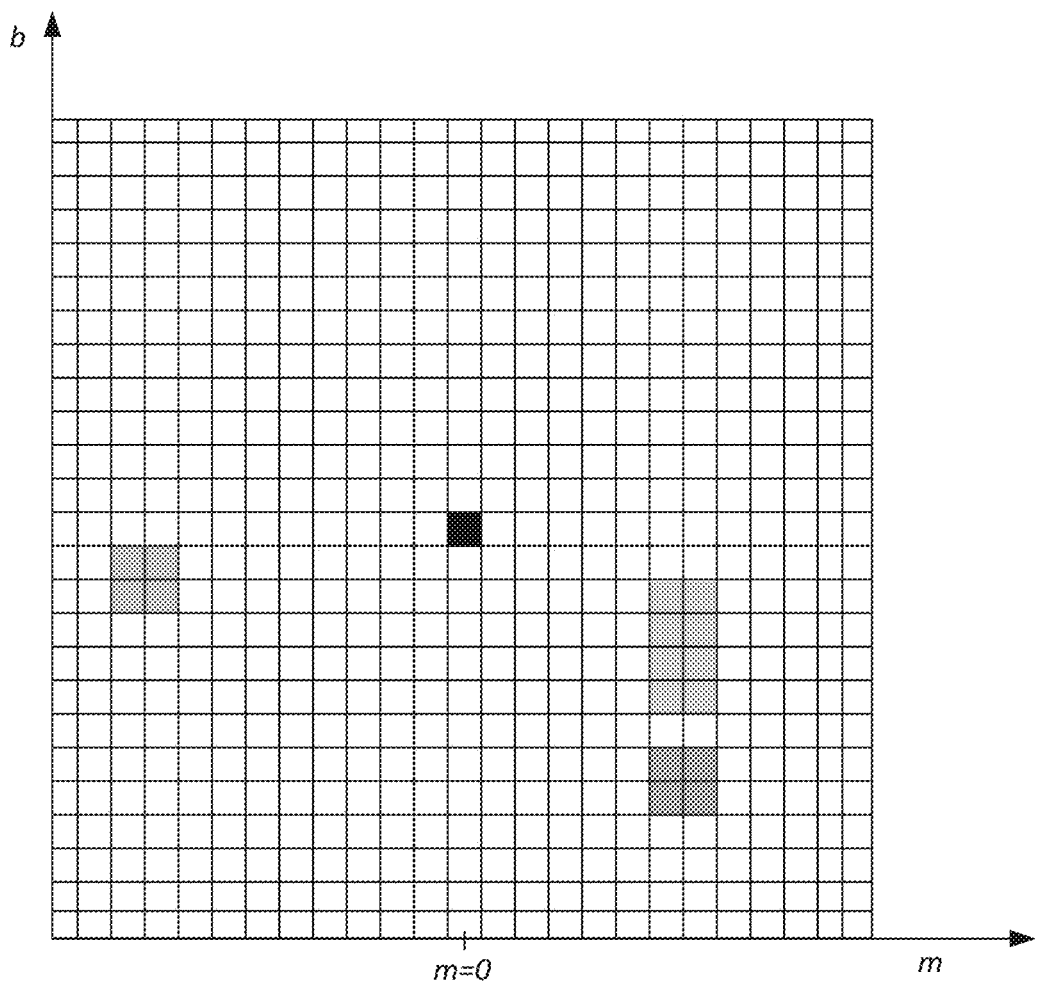
FIG. 5 is an exemplary histogram, in accordance with a representative embodiment.

FIG. 5 is an exemplary histogram. Its horizontal axis represents the slope m of a given line, and its vertical axis represents its intercept. The ranges of possible values of m and b are partitioned to obtain a grid, and the number of edge points on a given line is represented by the shading of the corresponding box in the histogram. In FIG. 5, darker shades correspond to more edge points, and lighter shades correspond to fewer edge points.

Note that other features of FIG. 3 also contribute weight to the histogram, but to a lesser degree. For example, the hull of the vessel includes two substantially-linear segments, one with positive slope and one with negative slope. The other vessel includes several short line segments of essentially equal slope and only slightly different intercepts. However, no other feature contributes as much weight as the horizon. Thus, as described more fully below, the horizon is identified as corresponding to the box of maximum weight in the histogram defined above.

In some implementations, only a subset of possible intercepts and slopes may be sampled. For example, in calm waters, the horizon is expected to be more or less horizontal. Thus, in some implementations, only a subset of lines of slope m satisfying $|m|<c$ for some value of c close to zero may be sampled. In some implementations, c is chosen to correspond to a horizon location between −15 and +15 degrees of the center of the camera's field of view. In some implementations, c is chosen to correspond to a horizon location between −40 and +40 degrees of the camera's field of view.

Similarly, in calm waters, the distance to the horizon is approximately $Ah^{1/2}$, where h is the height of the camera from sea level measured in meters, and A is a constant approximately equal to $3.6 \text{ km/m}^{1/2}$. If the horizon line has very small slope (as it is expected to in relatively calm waters), then the intercept of the line correlates in a known manner with the distance. Thus, in some implementations, only a subset of lines having an intercept corresponding to this distance may be sampled. For example, one may search only for lines corresponding to a distance within a certain interval centered at the distance $Ah^{1/2}$.

Limiting the search space of lines in this manner may have benefits, such as reducing the computational resources required to identify the horizon, as well as mitigating the risk of incorrectly identifying other long, straight structures (such as beaches or docks) as the horizon. Further refinements of determining a sampling range, in some implementations, are described below in non-calm waters.

Figure 6:
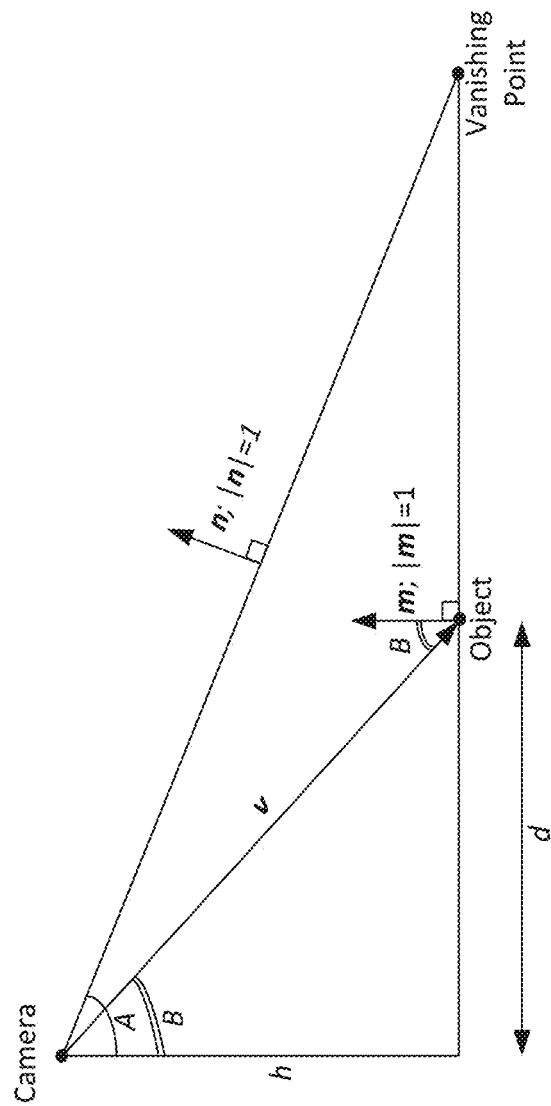
FIG. 6 is a side view of a camera mounted on a vessel, in accordance with a representative embodiment.

FIG. 6 is a side view of a camera mounted on a vessel. The vessel itself is not shown, to make clear the underlying geometry of the geolocation techniques described below. In FIG. 6, the camera is mounted a distance h above sea level. An object is in the camera's field of view. A vector from the camera to the object is denoted v, and the line of sight from the camera to the object makes an angle B from vertical. Similarly, the vanishing point (i.e., the location of the horizon) is shown, and the line from the camera to the horizon makes an angle A from vertical. The curvature of the Earth's surface is ignored in this diagram.

The distance from the vessel to the object is labeled d. The geolocation problem involves identifying what the value of d is. One approach is to use the equation tan(B)=d/h. Insofar as B can be readily determined (as described below) and h is known, d can be determined from this equation. However, for faraway objects, B is very close to 90 degrees, which is a singular point of the tangent function. This introduces a numerical instability, making this approach impractical for far away objects. An alternative approach is described below, using a single image from a single camera.

FIG. 6 also includes two vectors, m and n. The vector n is a unit vector that is normal (i.e., perpendicular) to the plane passing through the camera and the horizon. The vector m is a unit vector normal to the sea surface. In practice, since the distance from the vessel to the horizon is relatively far, angle A will be very close to 90 degrees. The vector n and the vector m will consequently point in substantially the same direction. Therefore, the vector m can often serve as a good approximation to n, and vice versa. The techniques described below make advantageous use of this fact.

In particular, once the angles A and B are known, the distanced can be determined by writing B in two ways. First, its numerical value can be determined directly from the image (as described below). Second, B satisfies the equation $$\cos(B) = (v \cdot m)/|v|,$$

where • indicates the dot product of vectors. Although coordinates for m are not readily identifiable from the image, the approximation n≈m can be used, since coordinates for a vector n can be readily determined from the angle A. This produces the approximation $$\cos(B) \approx (v \cdot n)/|v|.$$

Using $|v|=(d^2+h^2)^{1/2}$, (or equivalently, $d=(|v|^2-h^2)^{1/2}$) and v·n=h, this may be solved for d:

$$d \approx \sqrt{\left(\frac{h}{\cos B}\right)^2 - h^2}.$$

Figure 7:
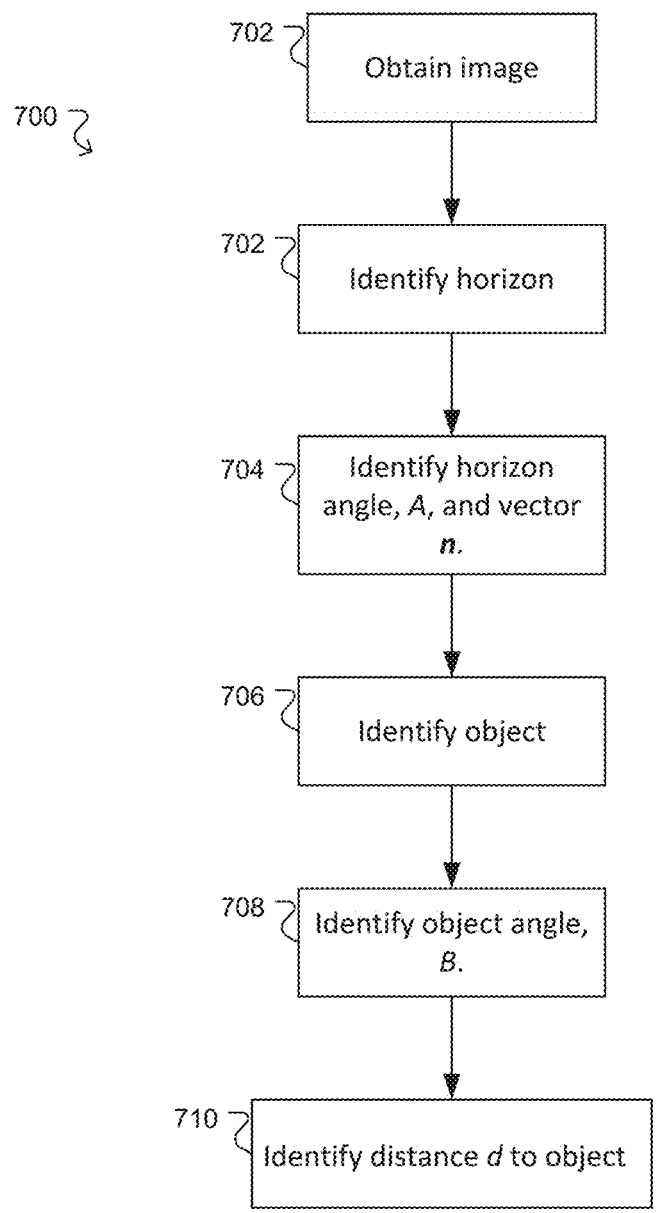
FIG. 7 is a flowchart of a method for geolocating an object, in accordance with a representative embodiment.

FIG. 7 is a flowchart of a method for geolocating an object from an image. The method 700 begins by obtaining an image. The image is obtained from a camera mounted on a vessel at a known height h above sea level. In step 702, the horizon is identified in the image. In some implementations, this is performed as described above, although in general any method of identifying the horizon in the image is sufficient.

Once the horizon is identified, the horizon angle A is identified (step 704). The horizon angle A, shown in FIG. 6, is the angle formed by a plane containing the horizon and the camera as it intersects a vertical line. Step 704 also includes identifying a unit normal vector to this plane, n, as described above.

Figure 8:
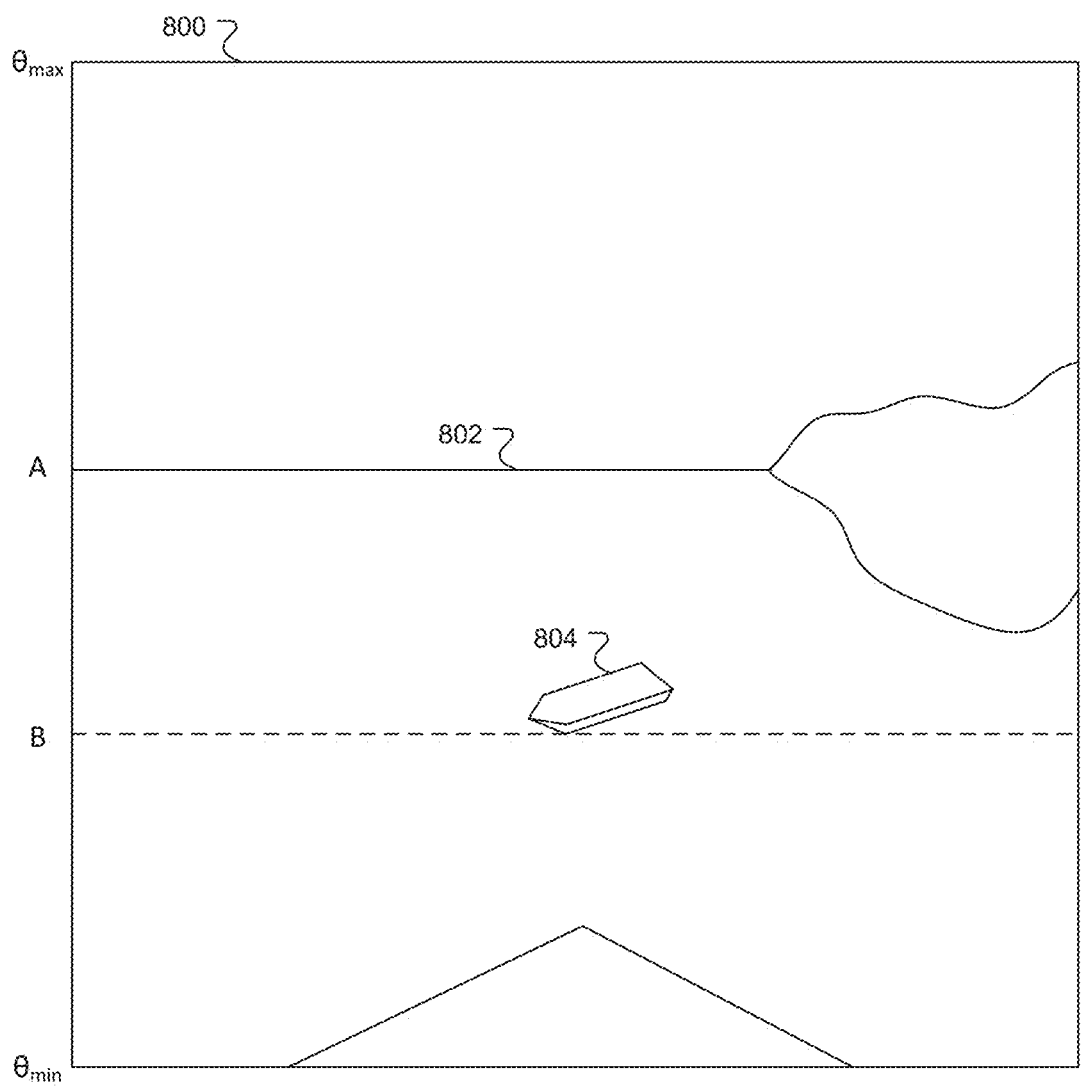
FIG. 8 is an exemplary image showing line-of-sight angles, in accordance with a representative embodiment.

FIG. 8 is an exemplary image showing identification of line-of-sight angles. FIG. 8 shows an image 800 with the horizon 802 and an object 804. In FIG. 8, the y-coordinate (that is, the vertical coordinate) of an image corresponds to the line of sight angle. In more detail, the image 800 is acquired by a camera having a field of view ranging from a line of sight angle $\theta_{min}$ (at the bottom of the image) to $\theta_{max}$ (at the top of the image), in which these angles depend on the physical orientation of the camera as well as the geometry of its lens. Disregarding any lens distortion (which is discussed below), the line-of-sight angle varies linearly with the y-coordinate of an object.

Referring back to FIG. 7, in step 706, an object is identified from in the image and its line-of-sight angle B is identified (step 708). In some implementations, this is performed as described above, although in general any method of identifying objects in an image is sufficient. Once B is known, the distance d to the object can be approximated using the formula discussed with respect to FIG. 6.

Figure 9:
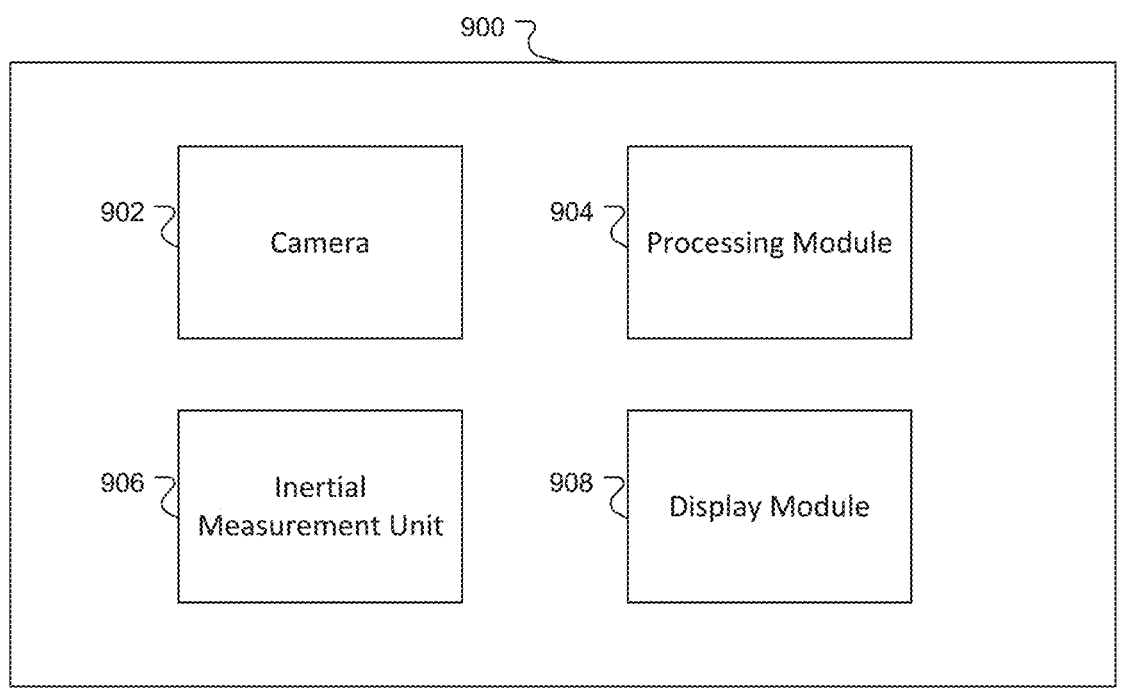
FIG. 9 is a block diagram of a geolocation system, in accordance with a representative embodiment.

Referring to FIG. 9, a block diagram of a geolocation system is shown. The geolocation system includes a camera 902, an image processing module 904, an inertial measurement unit 906, and a display module 908. The camera 902 can include any standard visible-light, infrared, night vision, or other camera capable of producing a digital image of its field of view. In some implementations, the camera includes an AXIS Q1798-LE or AXIS P3807-PVE network camera.

The processing module 904 includes hardware, software, or a combination of hardware and software operable to perform the calculations described above. This may include (but need not be limited to) performing edge detection and/or feature extraction algorithms, identifying linear features via a Hough transform or other suitable technique, performing lens transformations (described below), geolocating identified objects, etc. The processing module 904 is also operable to combine or otherwise overlay derived data with one or more images to produce augmented reality content, as shown below with respect to FIGS. 10 and 11.

The inertial measurement unit 906 includes hardware, software, or a combination of hardware and software operable to determine the motion of the vessel through the water. This includes the ability to determine the roll and pitch angles of the vessel at a given moment. In some implementations, the inertial measurement unit may include one or more accelerometers, gyroscopes, optical sensors, magnetic sensors, or other sensors operable to determine pitch and roll angles.

The display module 908 includes hardware, software, or a combination of hardware and software operable to display images obtained from the camera 902, produced by the processing module 904, or elsewhere. In some implementations, the display module 908 includes a display onboard the vessel. In some implementations, the display module 908 includes a display remote from the vessel, e.g. a remote computer or mobile device.

Figure 10:
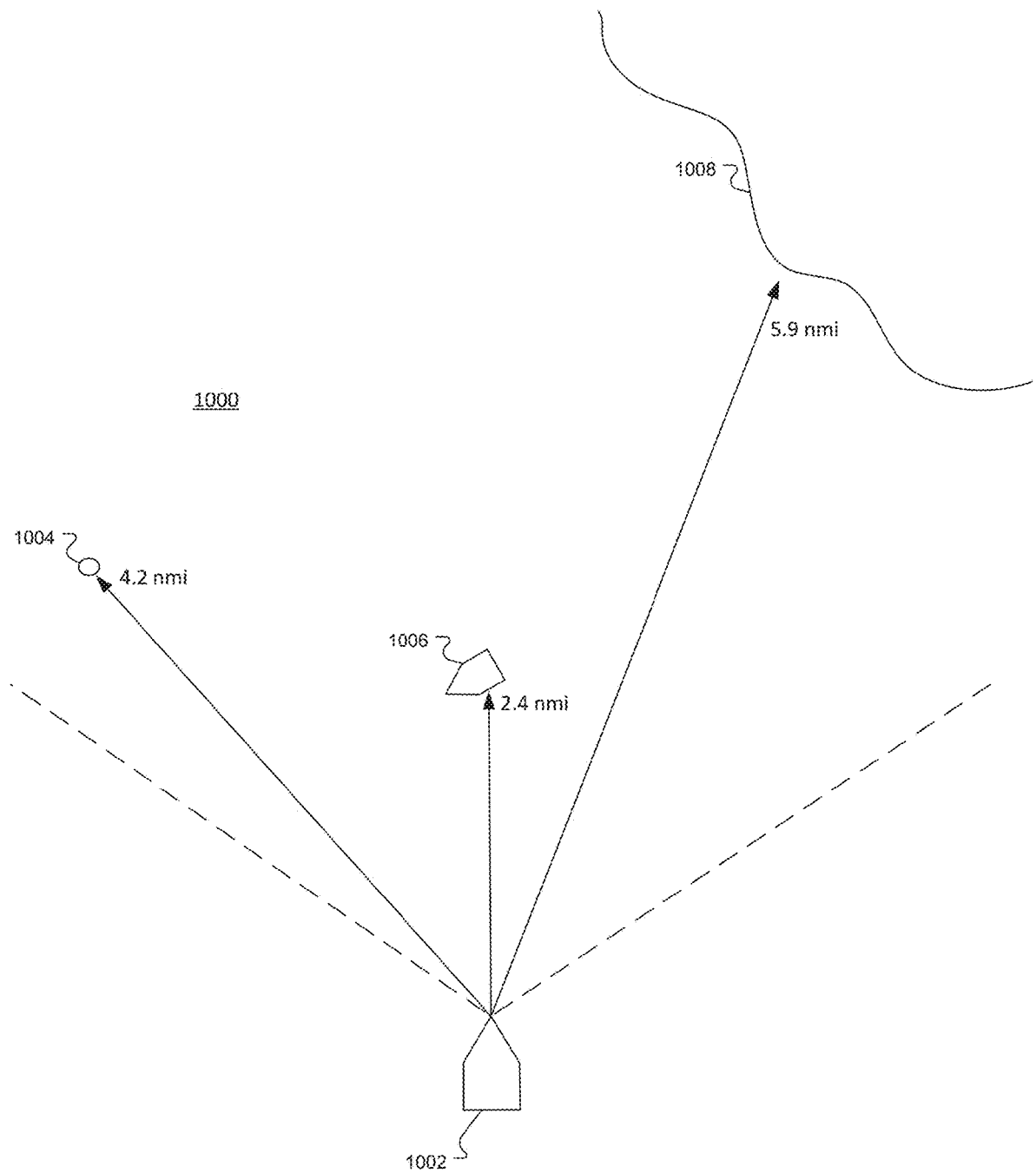
FIG. 10 is an augmented reality map, in accordance with a representative embodiment.

The output of the geolocation system can be used for a variety of purposes. In some implementations, the output can be used to provide an augmented reality interface for viewing information pertinent to the vessel and its surroundings. For example, FIG. 10 is an augmented reality map. In some implementations, the map 1000 includes both static and dynamic content. The static content may include content such as land masses 1008, permanent buoys 1004, predefined navigational corridors, etc. The dynamic content may include objects 1006 detected by the geolocation module, as well as an indication of the distance from the vessel 1002 to the various objects.

In some implementations, the output of the geolocation system can be used to trigger navigational maneuvers or other actions. For example, when an object is within a threshold distance, the vessel may autonomously take make an evasive maneuver such as reducing its speed or changing its heading. In some implementations, the output of the geolocation system may be communicated to other vessels' control systems, triggering the other vessels to make navigational maneuvers or take other action when an object is within a threshold distance. Besides navigational maneuvers, such other action may include playing multimedia content on a loudspeaker or display, activating or deactivating one or more pieces of equipment on the vessel, etc.

Figure 11:
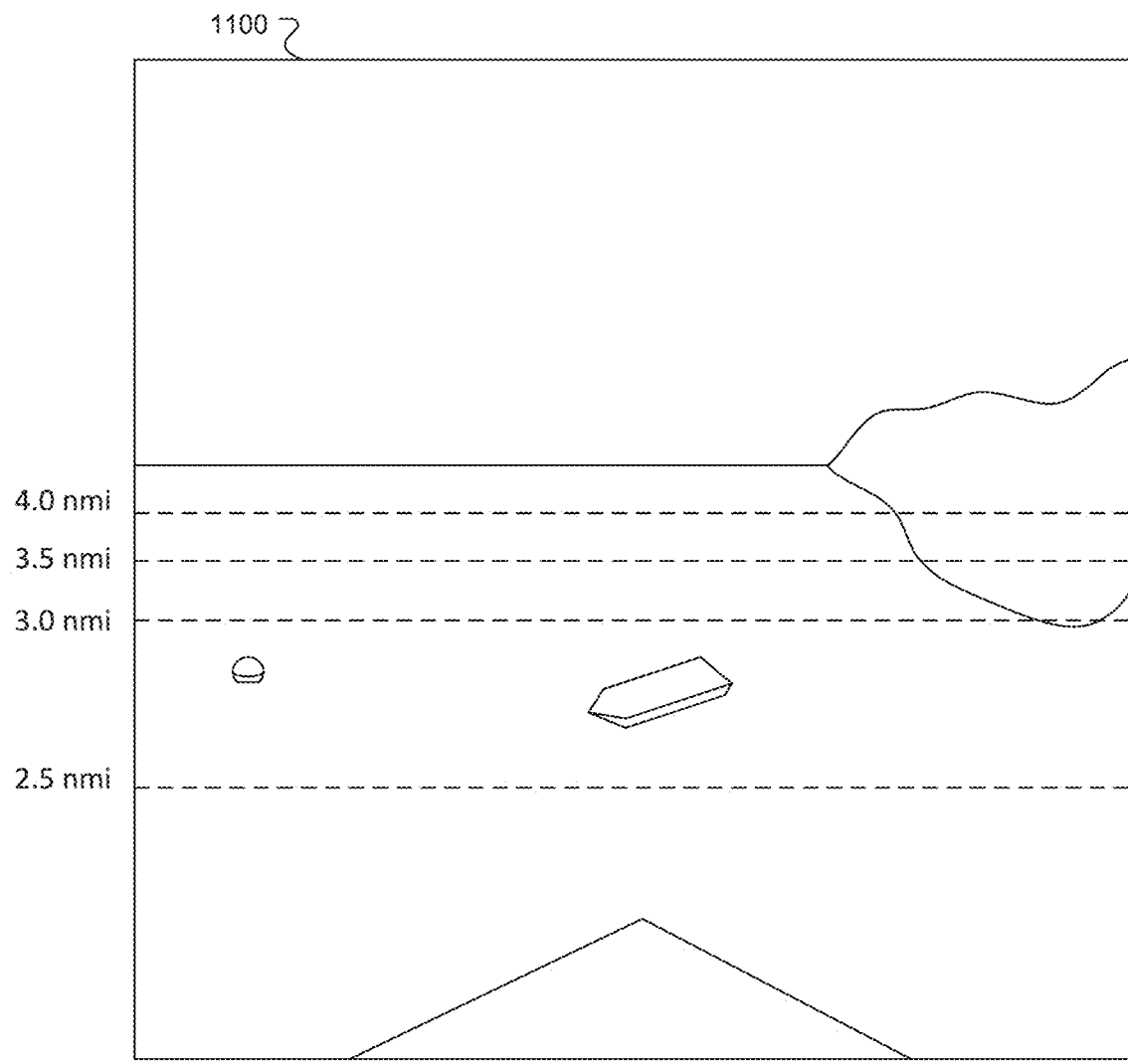
FIG. 11 is an augmented reality image, in accordance with a representative embodiment.

FIG. 11 is an augmented reality image. The augmented reality image is another example of content that may be provided by the augmented reality interface. In FIG. 11, a raw image 1100 from the camera is overlaid with dashed lines indicating various distances to the vessel. This type of interface may be useful, for example, to help a user of the interface gauge the distance to a point that does not correspond to an object otherwise detected by the geolocation system.

The techniques described above have been discussed under certain idealized conditions—namely, conditions in which the vessel is in relatively calm waters, and the camera lens has trivial geometry. In practice, the vessel may have nonzero roll or pitch angles in wavy waters or while turning, and the camera lens may have nontrivial geometry. For example, a fisheye lens is often used to maximize the camera's field of view, which results in certain distortions in the acquired image.

Figure 12:
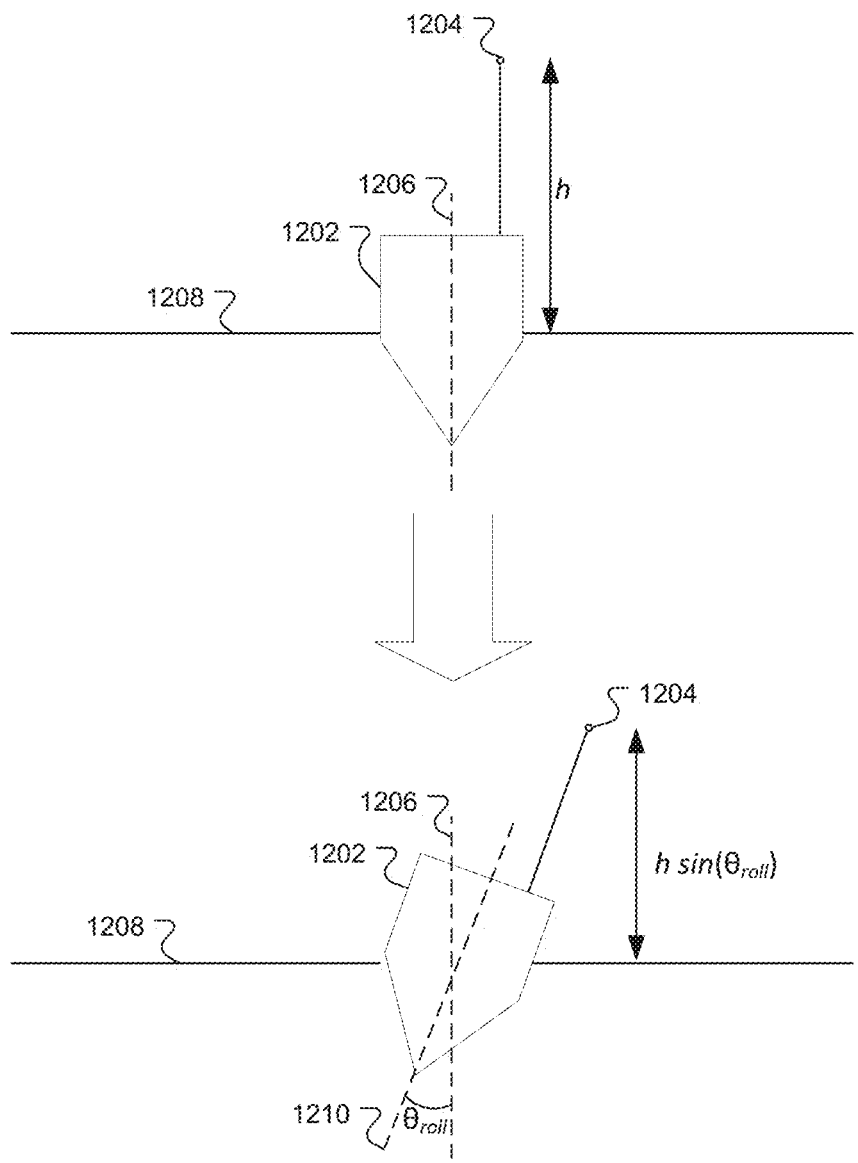
FIG. 12 is a cross-sectional view of a vessel in calm or wavy waters, in accordance with a representative embodiment.

FIG. 12 is a cross-sectional view of a vessel in either calm or relatively wavy waters. The top portion shows the vessel 1202 in relatively calm waters. The camera 1204 is mounted on the vessel at a distance h from sea level, and the vertical axis 1206 perpendicular to the sea surface 1208 coincides with the vertical axis of the vessel 1202.

By contrast, the lower portion of FIG. 12 shows the vessel 1202 with a nontrivial roll angle, $\theta_{roll}$ formed between the axis of the ship 1210 and the vertical axis 1206 perpendicular to the sea surface 1208. Because of this angle, the distance of the camera 1204 from the sea surface is scaled by $\sin(\theta_{roll})$.

A similar phenomenon occurs when the vessel has a nonzero pitch angle, $\theta_{pitch}$. Thus, in general, the height of the camera above sea level is given by $h \sin(\theta_{roll})\sin(\theta_{pitch})$.

In some implementations, the pitch and roll angles may be measured (e.g., by the inertial measurement unit) at the time a given image is acquired. When processing that image, the uncorrected height h may be replaced with $h \sin(\theta_{roll})\sin(\theta_{pitch})$ to account for the vessel's motion.

Figure 13:
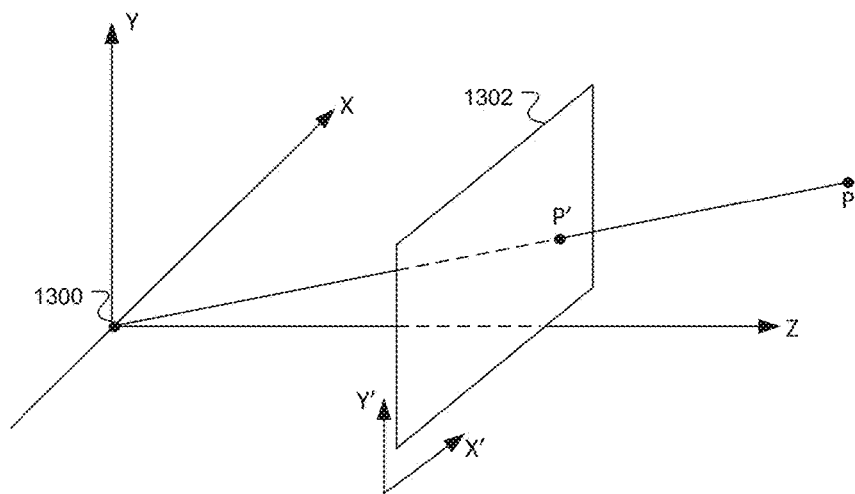
FIG. 13 is a schematic view of image acquisition, in accordance with a representative embodiment.

FIG. 13 is a schematic view of image acquisition using a lens with trivial geometry. In this case, rays of light reflected from objects (such as the ray shown from point P in FIG. 13) are not deflected as they pass through the camera lens on the way to the focal point 1300 of the camera. The light rays fall onto a rectangular sensor (or sensor array) 1302, at a location corresponding to the object. For example, the point P' in the sensor 1302 corresponds to point P.

The techniques described above were discussed without regard to lens geometry, as if such geometry were trivial. However, in some cases a lens will have nontrivial geometry, in which light rays are deflected in some manner between the object and the sensor 1302. In this case, the raw image acquired by the camera is first processed by means of a lens transform to account for the deflection experienced by the incident light rays through the lens.

Figure 14:
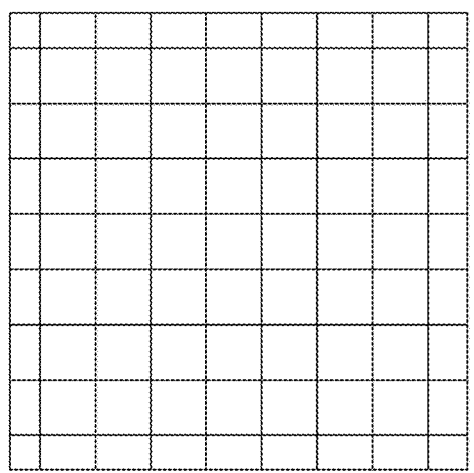
FIG. 14 is an exemplary illustration of a lens transform, in accordance with a representative embodiment.
Figure 14:
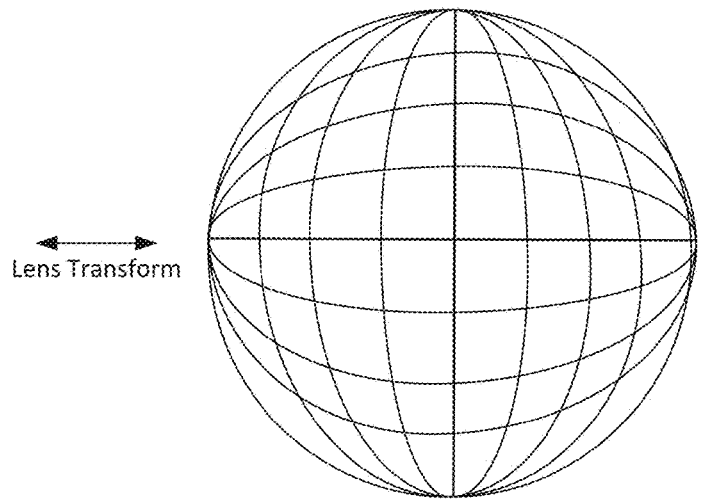

FIG. 14 is an exemplary illustration of a lens transform. Such a transform is typical of a fisheye type lens. In general, a lens transform maps certain curves in an acquired image to straight lines in the processed image (and vice versa), thereby accounting for distortions to the image introduced by the lens.

The lens transform for a particular camera depends on the particular lens being used. Lens transforms are known apriori to those skilled in the art; and in case a lens is damaged or aberrated, the transform for that particular lens may be determined empirically (e.g., by acquiring an image of a uniform grid, and fitting curves to the resulting distorted image).

The methods, components, modules, or other approaches described above may be implemented in software, or in hardware, or a combination of hardware and software. The software may include instructions stored on a non-transitory machine-readable medium, and when executed on a general-purpose or a special-purpose processor implements some or all of the steps summarized above. The hardware may include Application-Specific Integrated Circuits (ASICs), Field Programmable Gate Arrays (FPGAs), and the like. The hardware may be represented in a design structure. For example, the design structure comprises a computer accessible non-transitory storage medium that includes a database representative of some or all of the components of a system embodying the steps summarized above. Generally, the database representative of the system may be a database or other data structure which can be read by a program and used, directly or indirectly, to fabricate the hardware comprising the system. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. In other examples, alternatively, the database may itself be the netlist (with or without the synthesis library) or the data set.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application-specific integrated circuits, programmable gate arrays, programmable array logic components, or any other device or devices that may be configured to process electronic signals. It will further be appreciated that a realization of the processes or devices described above may include computer-executable code created using a structured programming language such as C, an object-oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionalities may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory, or any other optical, electromagnetic, magnetic, infrared, or other device or combination of devices. In another aspect, any of the systems and methods described above may be embodied in any suitable transmission or propagation medium carrying computer-executable code and/or any inputs or outputs from the same.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. For example, regarding the methods provided above, absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computing) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method, comprising:
   obtaining an image showing a horizon and an object from a camera mounted on a seafaring vessel at a height h from sea level in calm water;
   obtaining a roll angle $\theta_{roll}$ and a pitch angle $\theta_{pitch}$ of the vessel from an inertial measurement unit;
   identifying a plane passing through the camera and the horizon, the plane identified as passing through the position of the camera and a line at sea level a distance D away from the camera given by D=A $\sin(\theta_{roll})\sin(\theta_{pitch})h^{1/2}$, where h is measured in meters and A is equal to 3.6 km/m$^{1/2}$;
   identifying a normal vector to the plane;
   identifying a distance from the seafaring vessel to the object using the normal vector to the plane; and
   on an augmented reality interface, displaying an augmented reality image including the object and the distance from the seafaring vessel to the object.

2. The method of claim 1, in which distance d from the seafaring vessel to the object is given by:

$$d = \sqrt{\left(\frac{h}{\cos B}\right)^2 - h^2}$$

where B is line-of-sight angle from the camera to the object, and h is a height above sea level at which the camera is mounted on the vessel in calm water.

3. The method of claim 2, in which the seafaring vessel includes an inertial measurement unit operable to report a roll angle $\theta_{roll}$ and a pitch angle $\theta_{pitch}$ of the vessel, and in which h is scaled in the equation of claim 2 by $\sin(\theta_{roll})\sin(\theta_{pitch})$.

4. The method of claim 1, in which the augmented reality interface includes a real time video feed from the camera.

5. The method of claim 1, in which the augmented reality interface includes an overhead map of a waterway showing the vessel and the object.

6. The method of claim 1, further comprising using the identified distance to make a navigational maneuver.

7. The method of claim 6, in which the navigational maneuver is made by the seafaring vessel.

8. The method of claim 6, in which the navigational maneuver is made by a vessel other than the seafaring vessel.

9. A system, comprising:
a camera mounted on a seafaring vessel at a height h from sea level in calm water; and
machine-readable instructions that, when executed, cause one or more processors to:
   obtain an image showing a horizon and an object from the camera;
   obtain a roll angle $\theta_{roll}$ and a pitch angle $\theta_{pitch}$ of the vessel from an inertial measurement unit;
   identify a plane passing through the camera and the horizon, the plane identified as passing through a position of the camera and a line at sea level a distance D away from the camera given by D=A $\sin(\theta_{roll})\sin(\theta_{pitch})h^{1/2}$, where h is measured in meters and A is equal to 3.6 km/m$^{1/2}$;
   identify a normal vector to the plane;
   identify a distance from the seafaring vessel to the object using the normal vector to the plane; and
   on an augmented reality interface, display an augmented reality image including the object and the distance from the seafaring vessel to the object.

10. The system of claim 9, in which distance d from the seafaring vessel to the object is given by:

$$d = \sqrt{\left(\frac{h}{\cos B}\right)^2 - h^2}$$

where B is line-of-sight angle from the camera to the object, and h is a height above sea level at which the camera is mounted on the vessel in calm water.

11. The system of claim 10, in which the seafaring vessel includes an inertial measurement unit operable to report a roll angle $\theta_{roll}$ and a pitch angle $\theta_{pitch}$ of the vessel, and in which h is scaled in the equation of claim 10 by $\sin(\theta_{roll})\sin(\theta_{pitch})$.

12. The system of claim 9, in which the augmented reality interface includes a real time video feed from the camera.

13. The system of claim 9, in which the augmented reality interface includes an overhead map of a waterway showing the vessel and the object.

14. The system of claim 9, further comprising using the identified distance to make a navigational maneuver.

15. The system of claim 14, in which the navigational maneuver is made by the seafaring vessel.

16. The system of claim 14, in which the navigational maneuver is made by a vessel other than the seafaring vessel.

17. A method, comprising:
obtaining an image showing a horizon and an object from a camera mounted on a seafaring vessel at a height h from sea level in calm water;
identifying a plane passing through the camera and the horizon, the plane identified from the image using a Hough transform that only samples an area of the image corresponding to an expected location of the horizon including a distance interval centered at Ah$^{1/2}$, where h is measured in meters and A is equal to 3.6 km/m$^{1/2}$;
identifying a normal vector to the plane;
identifying a distance from the seafaring vessel to the object using the normal vector to the plane; and
on an augmented reality interface, displaying an augmented reality image including the object and the distance from the seafaring vessel to the object.

18. A method, comprising:
obtaining an image showing a horizon and an object from a camera mounted on a seafaring vessel at a height h from sea level in calm water;
obtaining a roll angle $\theta_{roll}$ and a pitch angle $\theta_{pitch}$ of the vessel from an inertial measurement unit;
identifying a plane passing through the camera and the horizon, the plane identified from the image using a Hough transform that only samples an area of the image corresponding to an expected location of the horizon including a distance interval centered at A $\sin(\theta_{roll})\sin(\theta_{pitch})h^{1/2}$, where h is measured in meters and A is equal to 3.6 km/m$^{1/2}$;
identifying a normal vector to the plane;
identifying a distance from the seafaring vessel to the object using the normal vector to the plane; and
on an augmented reality interface, displaying an augmented reality image including the object and the distance from the seafaring vessel to the object.

19. A method, comprising:
obtaining an image showing a horizon and an object from a camera mounted on a seafaring vessel;
identifying a plane passing through the camera and the horizon;
identifying a normal vector to the plane;
identifying a distance from the seafaring vessel to the object using the normal vector to the plane, the distance d given by:

$$d = \sqrt{\left(\frac{h}{\cos B}\right)^2 - h^2}$$

where B is line-of-sight angle from the camera to the object, and h is a height above sea level at which the camera is mounted on the vessel in calm water; and
on an augmented reality interface, displaying an augmented reality image including the object and the distance from the seafaring vessel to the object.

20. A system, comprising:
a camera mounted on a seafaring vessel at a height h from sea level in calm water; and
machine-readable instructions that, when executed, cause one or more processors to:
   obtain an image showing a horizon and an object from the camera;
   identify a plane passing through the camera and the horizon, the plane identified from the image using a Hough transform that only samples an area of the image corresponding to an expected location of the horizon including a distance interval centered at Ah$^{1/2}$, where h is measured in meters and A is equal to 3.6 km/m$^{1/2}$;
   identify a normal vector to the plane;
   identify a distance from the seafaring vessel to the object using the normal vector to the plane; and on an augmented reality interface, display an augmented reality image including the object and the distance from the seafaring vessel to the object.

21. A system, comprising:

a camera mounted on a seafaring vessel at a height h from sea level in calm water; and machine-readable instructions that, when executed, cause one or more processors to:

obtain an image showing a horizon and an object from the camera;

obtain a roll angle $\theta_{roll}$ and a pitch angle $\theta_{pitch}$ of the vessel from an inertial measurement unit;

identify a plane passing through the camera and the horizon, the plane identified from the image using a Hough transform that only samples an area of the image corresponding to an expected location of the horizon including a distance interval centered at A $\sin(\theta_{roll})\sin(\theta_{pitch})h^{1/2}$, where h is measured in meters and A is equal to 3.6 km/m$^{1/2}$;

identify a normal vector to the plane;

identify a distance from the seafaring vessel to the object using the normal vector to the plane; and on an augmented reality interface, display an augmented reality image including the object and the distance from the seafaring vessel to the object.

22. A system, comprising:

a camera mounted on a seafaring vessel; and machine-readable instructions that, when executed, cause one or more processors to:

obtain an image showing a horizon and an object from the camera;

identify a plane passing through the camera and the horizon;

identify a normal vector to the plane;

identify a distance from the seafaring vessel to the object using the normal vector to the plane, the distance d given by:

$$d = \sqrt{\left(\frac{h}{\cos B}\right)^2 - h^2}$$

where B is line-of-sight angle from the camera to the object, and h is a height above sea level at which the camera is mounted on the vessel in calm water; and on an augmented reality interface, display an augmented reality image including the object and the distance from the seafaring vessel to the object.

* * * * *